Aug. 1, 1933.  N. FEINEN  1,920,852
TIRE RETREADING MACHINE
Filed Oct. 14, 1931  4 Sheets-Sheet 2
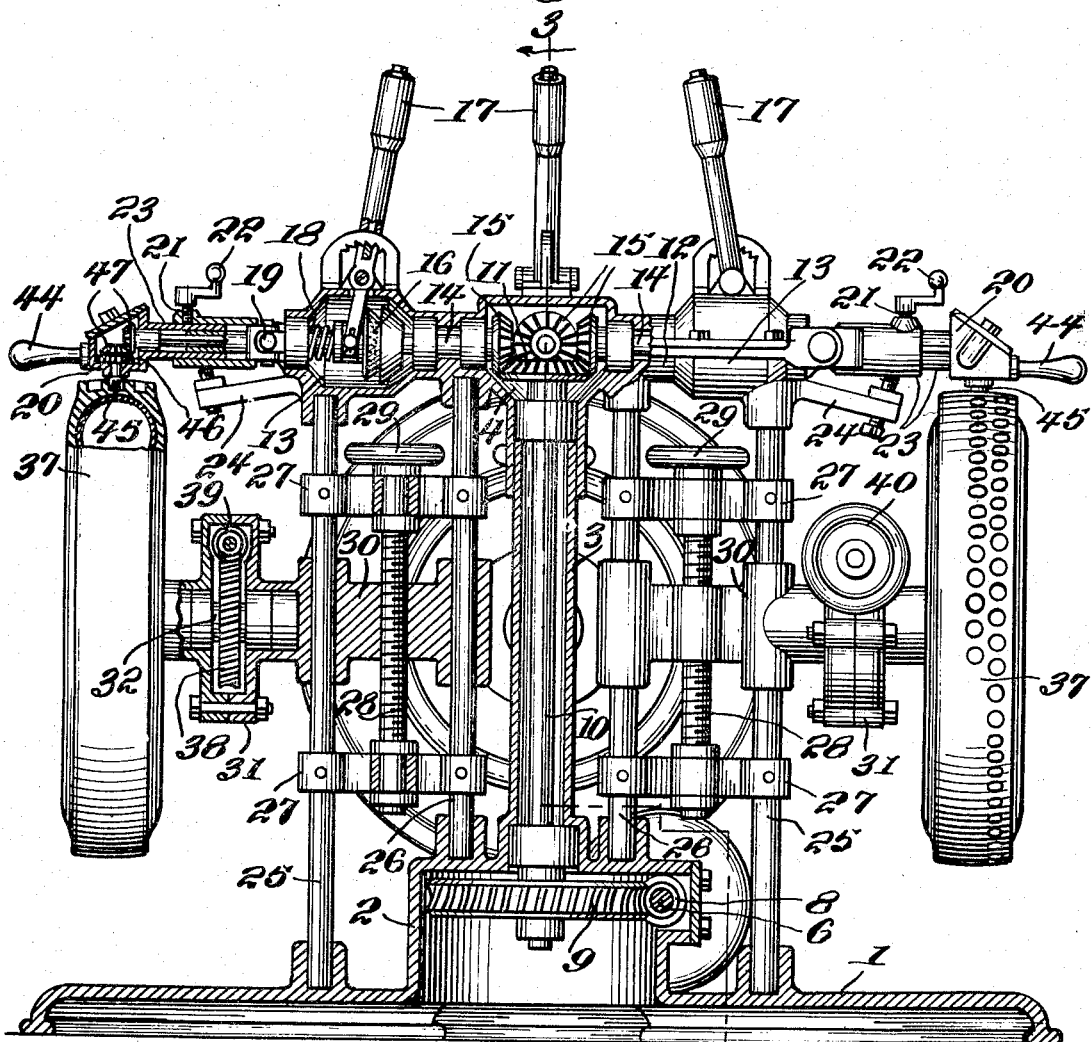
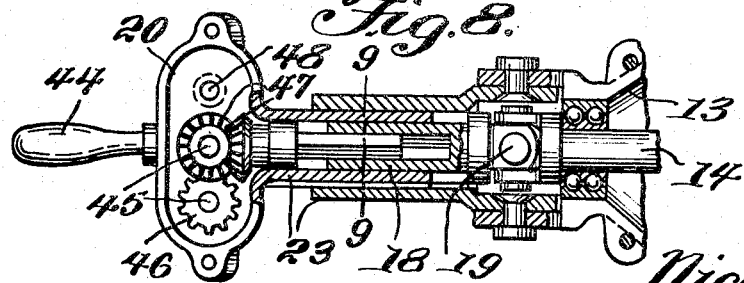

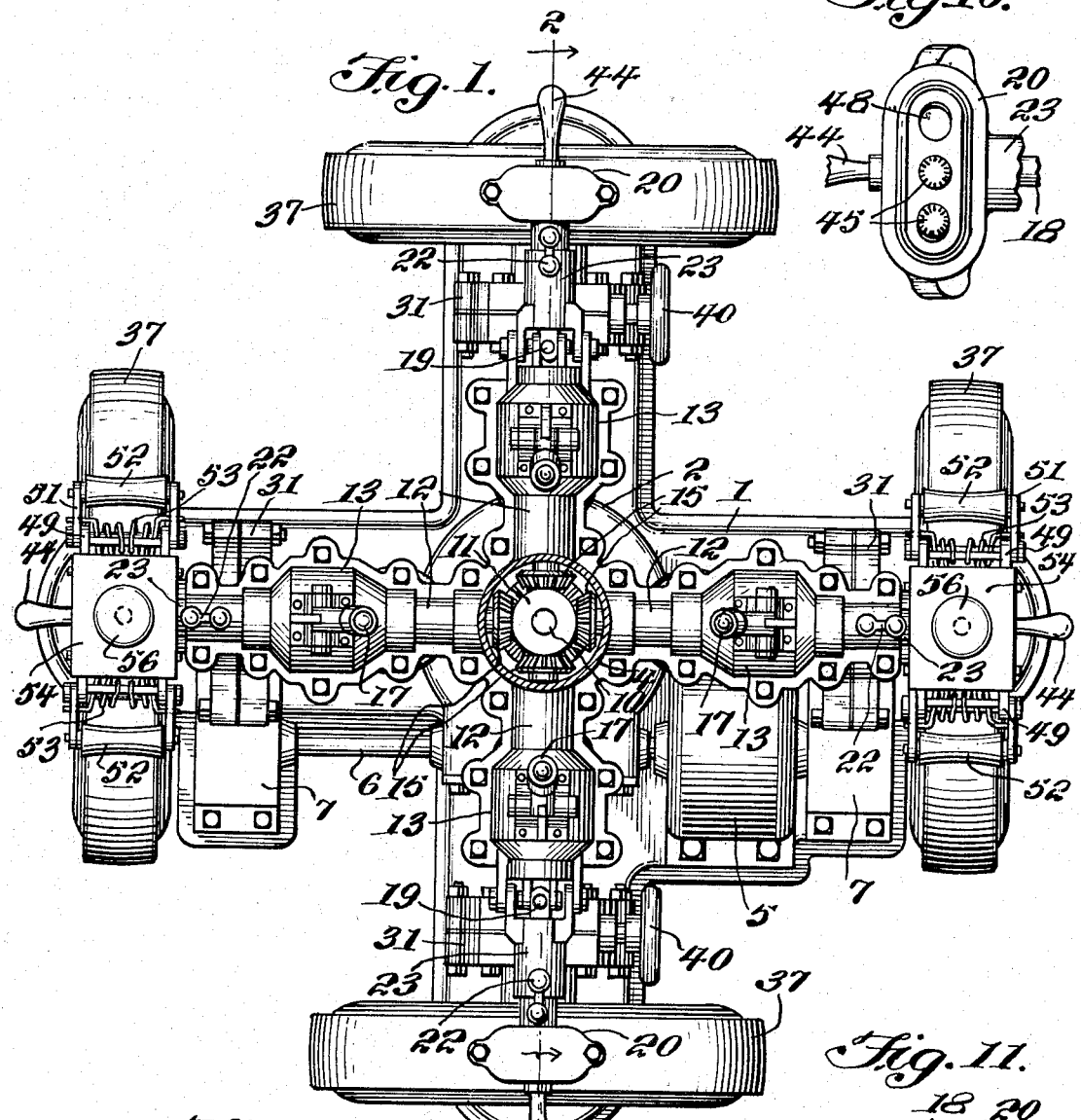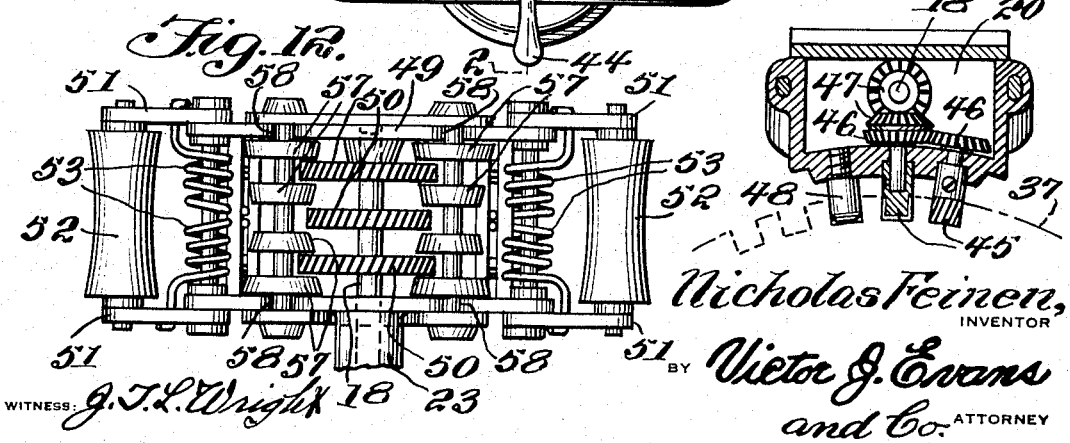

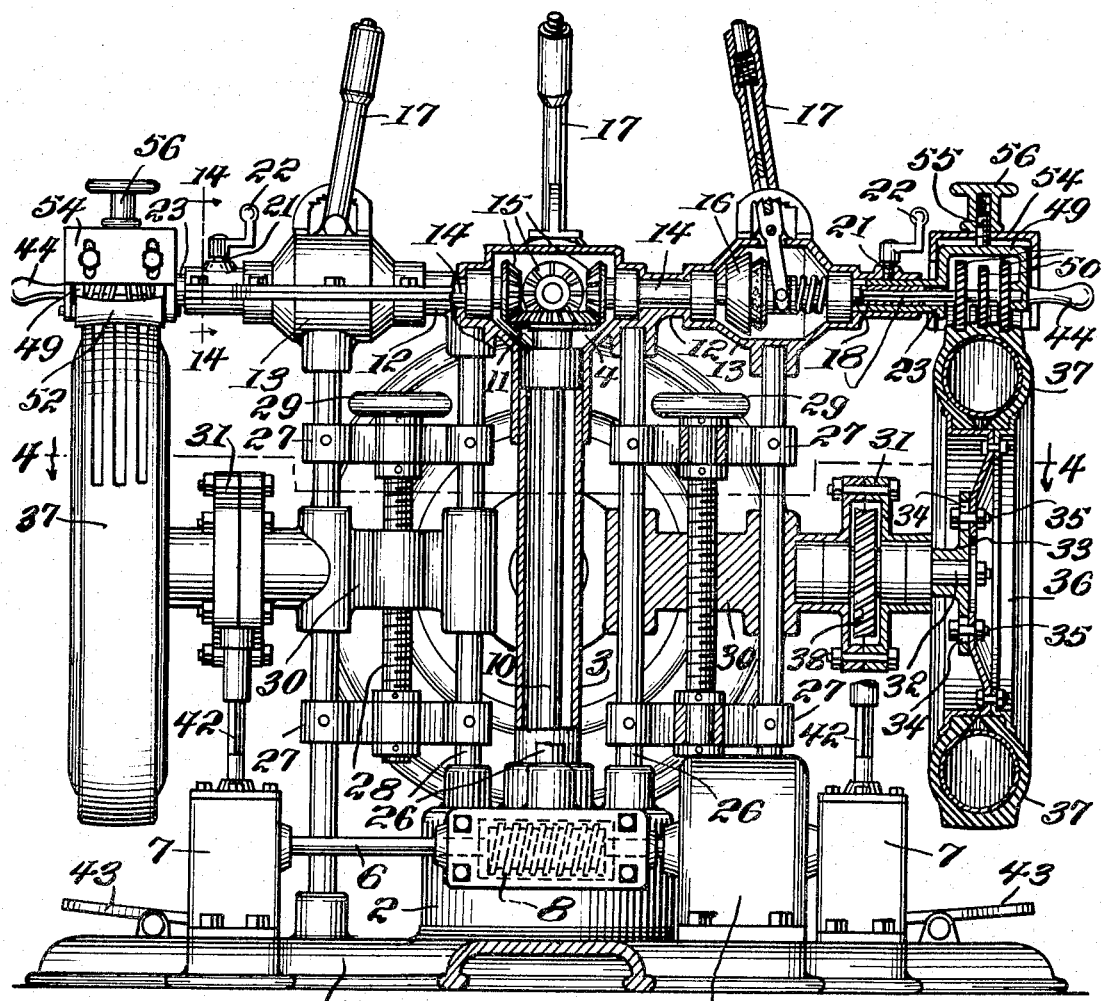
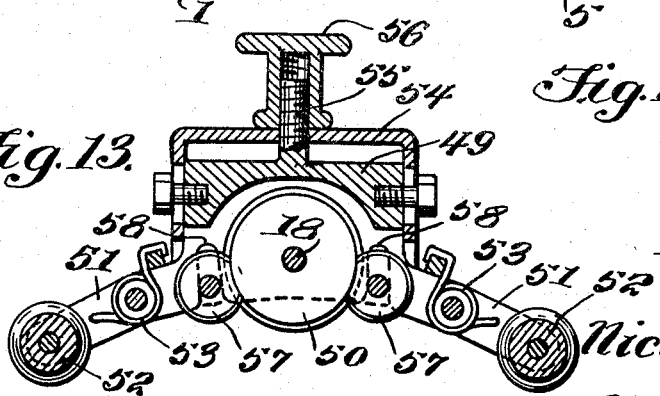

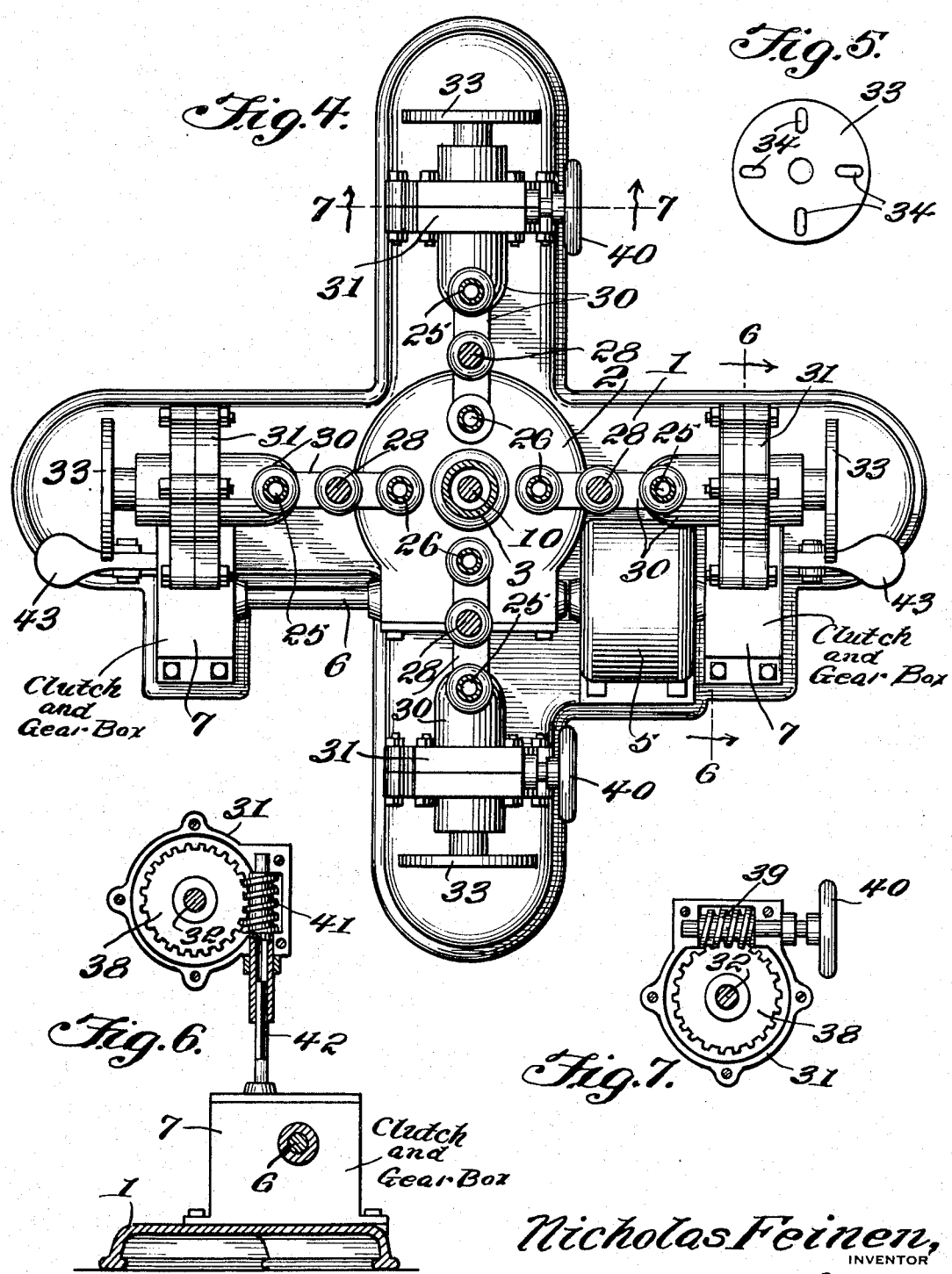

Patented Aug. 1, 1933

1,920,852

UNITED STATES PATENT OFFICE 1,920,852

TIRE RETREADING MACHINE

Nicholas Feinen, Buffalo, N. Y.

Application October 14, 1931. Serial No. 568,818

3 Claims. (Cl. 90—20)

This invention relates to tire retreading machines and has for the primary object, the provision of a device especially adapted for forming non-skid surfaces on motor vehicle tires after such tires have been worn and become smooth, thereby restoring non-skid qualities to the tires so that skidding will be reduced to a minimum.

Another object of this invention is the provision of means whereby rib type treads or vacuum type treads may be made on the smooth tread surfaces of worn tires.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view partly in section illustrating a tire retreading machine constructed in accordance with my invention.

Figure 2 is a sectional view taken on the line 2—2 of Figure 1.

Figure 3 is a sectional view taken on the line 3—3 of Figure 2.

Figure 4 is a sectional view taken on the line 4—4 of Figure 3.

Figure 5 is a side elevation illustrating a wheel attaching plate.

Figure 6 is a detail sectional view taken on the line 6—6 of Figure 4.

Figure 7 is a detail sectional view taken on the line 7—7 of Figure 4.

Figure 8 is a fragmentary sectional view illustrating the drive means for one of the cutters.

Figure 9 is a detail sectional view taken on the line 9—9 of Figure 8.

Figure 10 is a fragmentary bottom plan view illustrating one of the cutters employed for forming a vacuum type tread.

Figure 11 is a fragmentary sectional view illustrating the same associated with the tread of a tire.

Figure 12 is a fragmentary top plan view illustrating one of the cutters for forming the rib type tread.

Figure 13 is a detail sectional view illustrating the cutter for forming the rib type tread.

Figure 14 is a sectional view taken on the line 14—14 of Figure 3.

Referring in detail to the drawings, the numeral 1 indicates a base having formed centrally thereon a gear housing 2 provided with a vertically disposed tubular standard 3 supporting at its upper end a gear housing 4. An electric motor or other power source 5 is mounted on the base 1 with the shaft 6 thereof extending through the gear housing 2 and also into gear boxes 7 mounted on the base 1. A worm 8 is secured to the shaft 6 within the gear housing 2 and meshes with a worm gear 9 secured to the lower end of a shaft 10 journalled in the tubular standard 3 and has secured to its upper end a bevelled gear 11 for operating shafts of tire treading devices.

Extending radially from the gear housing 4 are shaft casings 12 terminating into clutch housings 13. Shafts 14 are journalled in the casings 12 and extend into the gear housing 4 and have secured thereto bevelled gears 15 meshing with the bevelled gear 11. The outer ends of the shafts extend into the clutch housings 13 and have associated therewith clutches 16 controlled by pivotally mounted hand levers 17 which may be moved into and held in various adjusted positions for engaging and disengaging the clutches. Shafts 18 are connected to the clutches 16 and one pair of said shafts 18 are provided with universal joints 19 to permit the outer ends of the shafts to be moved relative to the inner ends of the clutches. Said pair of shafts 18 extend into gear boxes 20 of the tread forming devices. The outer portions of the shafts 18 are sectional and have sliding relation so that the tread forming devices may be adjusted relative to tires supported by the machine. The sectional portions of the shafts 18 are locked in various adjusted positions by set bolts 21 having handles 22. The shafts 18 are surrounded by telescopic casings 23, one section of each casing hinged to its respective clutch housing 13 while its companion section is formed on its respective tread forming device. The set bolts 21 are carried by the sections of the telescopic shaft casings 23 for the purpose of permitting the sections to be adjusted and held in any of their adjusted positions and consequently hold the sectional portions of the shafts 18 in their adjusted positions. Stops or rests 24 are carried by clutch housings for limiting the downward movements of the tire treading devices.

The clutch housings are supported by standards 25 mounted on the base and the shaft casings 12 are supported by standards 26 mounted on the gear housing 2. The standards 25 and 26 are connected in pairs by braces 27 to which are journalled feed screws 28 having hand pieces 29. Heads 30 are slidably mounted on the pairs of standards 25 and 26 and have threaded engagement with the feed screws 28 whereby said heads may be adjusted upwardly and downwardly. The heads 30 are provided with separable gear housings 31 in which are journalled shafts 32 on which are secured wheel mounting plates 33. The plates 33 are provided with slots 34 to receive bolts or like fasteners 35 for adjustably and detachably securing vehicle wheels 36 thereto. The vehicle wheels have mounted thereon worn tires 37, that is, tires in which the non-skid has been worn off and still having a substantial tread surface and on which it is desired to again form a non-skid surface.

The shafts 32 have secured thereto worm gears 38 and one pair of worm gears is in mesh with worms 39 secured to hand operated shafts 40 whereby the respective vehicle wheels may be rotated as desired. The other pair of worm gears 38 are in mesh with worms 41, secured to adjustable shafts 42 extending into the gear boxes 7 and are connected to the shaft 6 of the electric motor 5 by suitable clutches controlled by the foot levers 43 mounted on the base 1, thus it will be seen that one pair of vehicle wheels supported by the machine may be rotated by the electric motor and the tires of these wheels are adapted to have the rib type tread formed thereon, while the other pair of tires supported by the machine are moved by hand through the hand shafts 40 and are adapted to have the vacuum type tread formed thereon.

The gear housings 20 form part of one pair of the retreading devices and each is provided with a handle 44 for adjusting the retreading devices relative to the tires. One pair of the retreading devices comprises pairs of recess cutters 45 connected together by gears 46 which are driven by the shafts 18 by gears 47. With the cutters 45 rotating and brought into engagement with the treads of the respective tires, a vacuum retread will be formed on the tires by making in the treads of the tires relatively spaced sockets. Associated with the cutters 45 are guide pins 48 which are carried by the respective gear housings 20 for the purpose of aiding in spacing the sockets in the tread of the respective tire. It being understood that the guide elements are positioned so as to enter the last socket formed in the tread of the tires so that the next pair of sockets made by the cutters 45 will be evenly spaced from the already formed sockets. During the forming of the sockets in the treads of the worn tires by the cutters 45 it is to be understood that after each cutting operation the respective tires are turned or advanced by the hand operated shafts 40.

The other pair of tread forming devices designed to form the rib tread to the tires is arranged in an oppositely disposed pair and each includes a head 49 formed integral with the shaft casing 23 with the outer end of the shaft 18 journalled therein and carrying relatively spaced rotating cutters 50 adapted to cut circumferential grooves in the tread of the tire. The head 49 has hinged thereto arms 51 carrying guide rollers 52 adapted to ride upon the tread of the tire as shown in Figure 3. The arms 51 are urged downwardly by springs 53 to cause the rollers 52 to ride against the tread of the tire. A housing 54 is slidably secured to the head 49 and is apertured to receive a screw threaded stem 55 formed on the head and to which an adjusting nut 56 is threaded. Gauge rollers 57 are carried by the housing 54 and are arranged on opposite sides of the circular cutters for the purpose of gauging the depth in which the cutters may form the grooves in the tread of the tire. By adjusting the nut 56 on the stem 55, the gauge rollers 57 may be varied relative to the circular cutters and thereby permit deeper or shallower grooves to be formed in different tires. The head 49 is provided with slots 58 to accommodate the pintles of the guide rollers 57 and permit adjustment of said guide rollers relative to the cutters.

With the shafts 18 attached to the cutters 50 rotating said cutters will form relatively spaced grooves in the respective tires, the depth of the grooves being regulated by the gauge rollers 57. It is to be understood that the tires having the rib threads formed thereon are rotated by the motor 5 by operating the treadles 43.

This device is especially devised for forming non-skid treads on large sized tires which have been worn to an extent that their ordinary non-skid has disappeared leaving the threads of the tires smooth. Large sized tires when in this state still have a tread of considerable thickness and capable of use for a long time or still have many miles of service left in them, but due to their smooth surfaces their traction obtaining qualities are greatly reduced and to restore these qualities my machine is employed. From the foregoing it will be noted that non-skid treads can be easily formed in the worn tires by mounting them upon the machine while they still remain mounted upon their respective wheels and that non-skid treads of the rib type or vacuum type may be made therein.

While I have shown and described the preferred embodiment of my invention, it will be understood that minor changes in construction, combination and arrangement of parts may be made without departing from the spirit and scope of my invention, as claimed.

Having thus described my invention, what I claim is:—

1. A tread forming device comprising a base, vertical supporting means on the base, a horizontal shaft and clutch housing carried by said supporting means, a shaft journaled in the housing, power means on the base, means connecting the power means to the shaft, an adjustable shaft carried by the housing, a clutch in the housing and connecting the shafts, tire supporting means adjustably mounted on the supporting means and movable towards and from the housing, cutters actuated by said adjustable shaft to act on a tire carried by said tire supporting means, and means imparting movement to the tire supporting means.

2. A tread forming device comprising a base, vertical supporting means on the base, a horizontal shaft and clutch housing carried by said supporting means, shafts journaled in said housing and one of said shafts adjustable as to length and movable angularly with respect to said housing, a power means carried by the base, means connecting the power means to one of the shafts, cutters carried by and actuated from the other shaft, a clutch in the housing for connecting said shafts, tire supporting means slidable on the vertical supporting means, and means for adjusting the tire supporting means to move a tire carried thereby towards and from the cutting means, and means for rotating the tire supporting means.

3. A tread forming device comprising a base, vertical supporting means on the base, a horizontal shaft and clutch housing carried by said supporting means, power means on the base, shafts journaled in the housing, means connecting one of the shafts to the power means, a clutch between said shafts and carried by the housing, a head carried by the housing and receiving the other shaft, cutters driven by the last-named shaft and carried by the head, yieldable supporting means carried by the head, gage rollers carried by said yieldable supporting means, means for adjusting said yieldable supporting means, a rotatable tire carrier adjustably mounted on the vertical supporting means to support a tire to the cutters and gage rollers, and means for rotating the tire carrier.

NICHOLAS FEINEN.